United States Patent
Miller et al.

(10) Patent No.: US 11,917,086 B2
(45) Date of Patent: Feb. 27, 2024

(54) SHORT-LIVED SYMMETRIC KEYS FOR AUTONOMOUS VEHICLES

(71) Applicant: GM Cruise Holdings LLC, San Francisco, CA (US)

(72) Inventors: Charles Miller, St. Louis, MO (US); Graziano Giuseppe Misuraca, New York, NY (US); Collin Richard Mulliner, Brooklyn, NY (US)

(73) Assignee: GM Cruise Holdings LLC, San Francisco, CA (US)

( * ) Notice: Subject to any disclaimer, the term of this patent is extended or adjusted under 35 U.S.C. 154(b) by 23 days.

(21) Appl. No.: 17/552,897

(22) Filed: Dec. 16, 2021

(65) Prior Publication Data
US 2023/0198784 A1    Jun. 22, 2023

(51) Int. Cl.
| H04L 29/06 | (2006.01) |
| H04L 9/32 | (2006.01) |
| G07C 5/00 | (2006.01) |
| H04L 9/08 | (2006.01) |
| H04L 9/40 | (2022.01) |

(52) U.S. Cl.
CPC ............ *H04L 9/3273* (2013.01); *G07C 5/008* (2013.01); *H04L 9/0894* (2013.01); *H04L 63/0435* (2013.01); *H04L 63/166* (2013.01)

(58) Field of Classification Search
CPC . H04L 9/3273; H04L 9/0894; H04L 63/0435; H04L 63/166; H04L 2209/84; H04L 9/3247; H04L 63/08; H04L 63/123; H04L 63/062; G07C 5/008; H04W 4/48; H04W 12/0431; B60R 2325/108
See application file for complete search history.

(56) References Cited

U.S. PATENT DOCUMENTS

| 2009/0083407 | A1* | 3/2009 | Adya | H04L 43/10 709/248 |
| 2014/0359296 | A1* | 12/2014 | Alrabady | H04L 9/3263 713/176 |
| 2015/0312038 | A1* | 10/2015 | Palanisamy | G06Q 20/385 713/155 |
| 2017/0257345 | A1* | 9/2017 | Westra | H04W 12/08 |
| 2020/0211301 | A1* | 7/2020 | Zhang | H04L 63/065 |
| 2020/0389791 | A1* | 12/2020 | Takemori | H04L 9/08 |

\* cited by examiner

*Primary Examiner* — Yogesh Paliwal
(74) *Attorney, Agent, or Firm* — Akona IP PC

(57) ABSTRACT

By way of example, there is disclosed a method of a device communicating messages in a vehicle, such as an autonomous vehicle (AV), including: participating in mutual authentication with a key server located on the vehicle; receiving from the key server a cryptographic key; using the cryptographic key for symmetric cryptography, comprising signing messages sent to or verifying messages received from another device of the vehicle; and clearing the cryptographic key at reboot.

20 Claims, 9 Drawing Sheets

SHORT-LIVED SYMMETRIC KEYS FOR AUTONOMOUS VEHICLES

FIELD OF THE SPECIFICATION

The present disclosure relates generally to autonomous vehicles (AV), and more particularly, though not exclusively, to short-lived keys for AVs.

BACKGROUND

Autonomous vehicles (AV), also known as self-driving cars, driverless vehicles, and robotic vehicles, are vehicles that use multiple sensors to sense the environment and move without human input. Automation technology in the AV enables the vehicles to drive on roadways and to perceive the vehicle's environment accurately and quickly, including obstacles, signs, and traffic lights. The vehicles can be used to pick up passengers and drive the passengers to selected destinations. The vehicles can also be used to pick up packages and/or other goods and deliver the packages and/or goods to selected destinations.

Data integrity may be a critical issue for AV operation. An AV includes a control computer that receives inputs from a host of sensors, and based on those inputs, makes control decisions for the vehicle. The computer may then send signals to drive actuators to affect a desired control function.

SUMMARY

By way of example, there is disclosed a method of a device communicating messages in a vehicle, such as an AV, including: mutually authenticating with a key server located on the vehicle; receiving from the key server a cryptographic key; using the cryptographic key for symmetric cryptography, comprising signing messages sent to or verifying messages received from another device of the vehicle; and clearing the cryptographic key at reboot.

BRIEF DESCRIPTION OF THE DRAWINGS

The present disclosure is best understood from the following detailed description when read with the accompanying FIGURES. In accordance with industry practice, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

DETAILED DESCRIPTION

Figure 1:
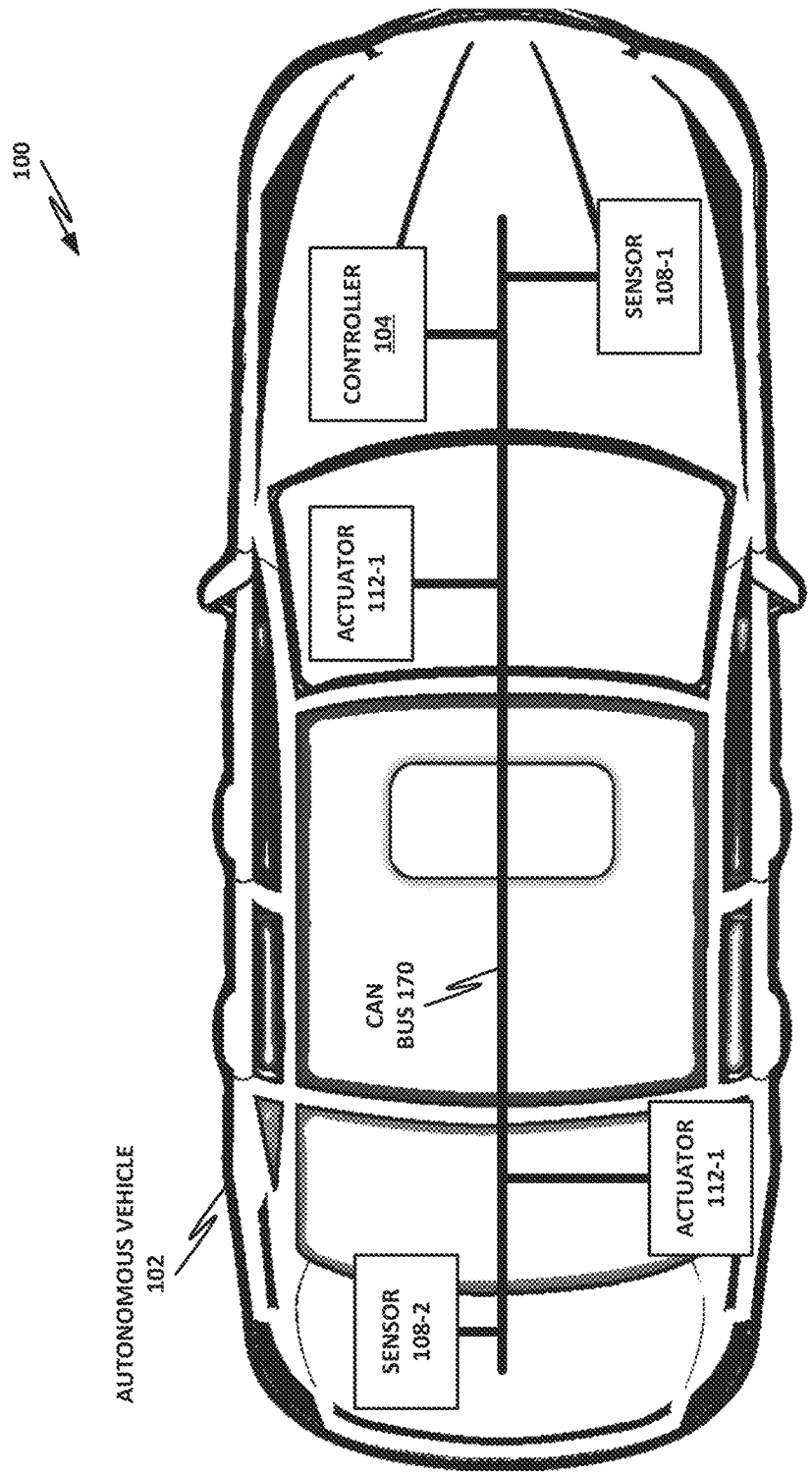
FIG. 1 is a block diagram illustrating an example AV.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not dictate a relationship between the various embodiments and/or configurations discussed. Different embodiments may have different advantages, and no particular advantage is necessarily required of any embodiment.

Loss of data integrity may come from one of two sources. First, a device may fail or become corrupted, in which case it may send erroneous data to a recipient. Second, an attacker may deliberately try to inject false data into the data stream. False sensor data could lead the control computer of an AV to calculate an incorrect control decision. False control signals could directly affect actuators. Either of these situations may lead the control computer to make undesirable control decisions. Thus, it is desirable to provide an AV in which data sources (e.g., senders) and data consumers (e.g., receivers) can establish trust, including one-way trust and mutual trust.

In some systems, mutual trust may be established using protocols, such as transport layer security (TLS), also known as secure socket layer (SSL). Throughout this specification, "TLS" may stand for any suitable version of TLS or SSL.

A TLS transaction can use asymmetric cryptography to establish trust and to provision a "session key," which can be used for the remainder of a session for symmetric encryption. The initial asymmetric exchange involves two keys: a public key and a private key. As the names imply, the private key is kept private to an entity, and the public key is publicly shared. The encryption is "asymmetric" because the key used to encrypt an object cannot be used to decrypt the object. Rather, anything encrypted with the public key can only be decrypted with the private key. Anything encrypted with the private key can only be decrypted with the public key. This is in contrast to symmetric encryption wherein content may be encrypted and decrypted only with the same key.

When two entities (e.g., a client and a server) begin a TLS transaction, they start with a "three-way handshake."

First, the client initiates contact by sending a "client hello" message. This includes the TLS version(s) the client supports, the cipher suite(s) the client supports, and a random string known as the "client random."

Second, the server responds with a "server hello" message. This includes the server's SSL certificate, which is cryptographically signed by the private key of a trusted certificate authority (CA). The signature may include a cryptographic hash appended to a data packet. A cryptographic hash is unique (or at least mathematically near enough) to the combination of the signed data and the key used to sign the data. As with asymmetric encryption, an asymmetric signature signed by the private key can only be verified with the public key and vice versa. The server certificate includes the server's public key. It also includes a TLS version chosen by the server, a cipher chosen by the server, and a "server random" value.

Third, the client verifies the server's certificate by using the CA's public key (sometimes provisioned in advance) to verify the signature on the SSL certificate. This ensures that the client is interacting with the legitimate owner of the domain. The client may now have confidence that the server is genuine.

Next, the client generates a "pre-master secret." The client encrypts the pre-master secret with the server's public key and sends the encrypted pre-master secret to the server. Because the pre-master secret can only be decrypted with the server's private key, only the client and the server know the pre-master secret.

The server and client can use a common algorithm, along with the client random, the server random, and the pre-master secret, to generate the same "session key." This session key can then be used for symmetric encryption and decryption of data during the session. Symmetric encryption may be preferred for encryption of larger payloads because it has less overhead and uses fewer resources than asymmetric encryption.

While TLS provides highly secure communication, it may be sub-optimal for an AV application. In such a vehicle, sensors may need to stream data to the control computer with low overhead, and the control computer may need to stream instructions to actuators with low overhead. Furthermore, in at least some embodiments, encryption may be an unnecessary overhead because, in some AV contexts, data integrity may be more important than data security. Thus, it may be sufficient to verify the source of the data via an appended signature using a symmetric key known to both devices.

To this end, an AV may prefer symmetric cryptography for encrypting or signing data. One method is to use a pre-shared key (PSK) for symmetric cryptography. For a PSK, the key is can be provisioned to both devices before communication starts. But provisioning the keys in-band (e.g., over the same network or bus that will carry the substantive communication) may be considered insecure. The initial key provisioning cannot be encrypted because the shared key is not yet known, so an attacker device (e.g., man-in-the-middle) could snoop the key and use the key to inject traffic.

Out-of-band provisioning of PSKs may be more secure, but also has disadvantages. For example, devices could be manually provisioned with PSKs when the car is assembled. However, PSKs have some security vulnerabilities, in part because PSKs can be used as long-term keys (for example, Wi-Fi can rely on a PSK to encrypt communication between sender and receiver). If the PSK is compromised or leaked, a rogue device could use the PSK to create false messages. By default, PSKs do not expire, and periodically manually updating PSKs can be cumbersome and inefficient.

However, symmetric cryptography can be advantageous for an AV if the keys are secure. For example, if a sender and receiver both possess a shared key, they can encrypt and/or sign messages using the shared key, which effectively takes the place of the session key as in a TLS transaction. Using symmetric cryptography, a sender (such as a sensor) can stream data to a receiver (such as the control computer) using a stateless one-way protocol (such as user datagram protocol (UDP)). The receiver may decrypt or verify the stream with the shared key. This may provide a low overhead transaction. Thus, the present specification provides a system and method for provisioning short-lived shared keys on an AV. Advantageously, short-lived keys can be used for efficient symmetric encryption and may also be used for efficient signing and verification of transmitted data. This may be used to ensure that messages received on a bus or other network are authentic, which can establish trust between devices.

Provisioning of the shared keys may be simplified by providing a local key server on the AV, which may run, for example, on the control computer or elsewhere on the AV. The key server and the devices may each have identity certificates issued and signed by an external trusted CA. These identity certificates may have a short time to live (TTL), such as 24 hours or a few days.

In an example, when the system (e.g., the car) boots, all previous shared certificates may be cleared. The system may reboot approximately every 24 hours or on some other schedule.

Clearing old shared keys on boot may involve, for example, storing shared keys in a volatile memory, so that the shared keys are lost when power is removed. When a device starts, it may first verify that its certificate is valid and unexpired. If the certificate is invalid or expired, the device may request a new certificate from the external trusted CA (e.g., via an external cloud connection).

With a valid certificate, the device may establish a one-time mutual TLS (mTLS) session with the key server. mTLS is a variation of TLS wherein both the client and the server provide signed identity certificates to one another. Thus, mTLS represents a strong mutual authentication scheme. This may provide for both the key server and the device to strongly trust one another and may allow the key server to provision the key with encryption so that the transaction cannot be snooped.

Some devices may be co-located on the same physical host as the key server (e.g., control functions on the control computer). The mTLS exchange may be unnecessary for such devices, and in some cases, appropriate keys may be provisioned directly into memory.

The key server or some other function of the control computer may maintain a database of which devices are expected to communicate with one another. Within the architecture of an AV, data sharing may imply an equivalent level of trust between the sender and receiver. Thus, there may be restrictions on devices sharing keys if they do not communicate with one another. Restrictions on unnecessary key duplication may help to preserve security. Even if a key were compromised, only those devices that have the key are compromised. In other words, there may be no single master key that unlocks communication with every device.

However, for devices that do communicate with one another, shared keys may be used. Because the key server maintains a record of which devices communicate with one another, the same key can be provisioned to both the sender and receiver. This enables the devices to communicate using symmetric cryptography, which may have less overhead and demand fewer resources than asymmetric cryptography. In the case of multicast, multiple receivers may receive the same key as a single sender.

The provisioned keys may be ephemeral. Once the key server has generated and provisioned a key to each device that needs the key for communication, the key server may discard the key. If the key server is not privy to the communication, there may be no need to retain the key. In an embodiment, the key server may store keys only in volatile memory so that all keys are lost on a power cycle or reboot. Once a key has been provisioned to every device that needs it, the memory location that holds the key may be released. In some embodiments, once a key has been distributed, the value stored in volatile memory may be actively destroyed, such as by overwriting with zeroes or random data.

Furthermore, while keys are stored in memory, the values may be encrypted, for example, with the key server's private key.

Similarly, devices may keep only ephemeral keys. For example, devices may keep keys only in volatile memory so that all keys are recycled when power is lost or the system boots. On each reboot of the system, each device may query the key server for a new symmetric key for communication.

This can help to preserve security within the system. Because keys may be refreshed at reboot, there is less danger of a stale key being compromised, as may occur with some PSK architectures. Furthermore, if keys are not stored in non-volatile memory, there is less danger of the keys being compromised if a device is physically compromised.

In some embodiments, communications between devices may be signed but not encrypted. In an AV ecosystem, data security protections may be secondary to data integrity. For example, it may be less problematic if an attacker can snoop the controller bus and see that the ambient temperature is "62.5° F." than if an attacker can snoop an online purchase and read a user's credit card number. The danger may lie less in data being learned and more in data being mimicked. If an attacker can inject false sensor data into the stream, the control computer may be led to make incorrect control decisions. If malicious actuator control signals can be injected, then an attacker may gain direct control of the vehicle.

To guard against malicious false signals and to simplify communication and preserve the real-time nature of communications, at least some data may be signed and not encrypted. An illustrative example of signing may include hashing the message content and signing the hash with the shared key. To a very high mathematical probability, the only way to have the correct hash and the correct signature is to have the identical message and the correct shared key. So even though non-private data may be sent in the clear, the receiver (using the same symmetric shared key as the sender) can have very high confidence that the message is genuine and was signed by the correct shared key.

However, this method may have a weakness. An attacker may not be able to generate genuine original messages but could enact a "replay attack." In a replay attack, a malicious actor snoops the bus and harvests old messages, including their valid signatures. The malicious actor may then inject those stale messages back into the bus, including their valid signatures (because the messages were genuine when originally sent).

A replay attacker is limited to valid messages previously sent. So it may be difficult for a replay attacker to drive a specific, premeditated result. But replay attacks can be used very effectively to flood the control bus with invalid messages (e.g., deliberate denial of service (DDoS)) or to just sow chaos. Either condition may result in undesirable operation of the AV.

To protect against replay attacks, devices may include a nonce (one-time value) with each message. Devices that receive a message with an already-used nonce may reject the message as stale, thus preventing replay attacks.

In an illustrative embodiment, a 32-bit or 64-bit counter may be used to store a message tag that may contain the nonce value. Each time the sender provides a message, the nonce value may be incremented. Both the sender and receiver may increment the nonce value with each message. If the receiver receives a message with an expired (already-used) nonce, it may reject the message. This can protect against replay attacks.

Different embodiments may have varying logic for dealing with an unmatching but non-stale nonce. For example, a receiver may have a nonce counter at 273 and then unexpectedly receive a message with a nonce of 274 or greater. This skip in nonce values may represent a missed valid message as it may be difficult for an attacker to forge a signed message with an unused nonce.

However, it may be desirable to discard the missed message if it does later appear on the bus. This can prevent an attacker from intercepting the message and saving it for later replay. Furthermore, if the delayed message is later delivered, even if it is legitimate, the data may be stale. Thus, in the case of real-time control data especially, it may be beneficial for the receiver to implement an algorithm as illustrated in pseudocode:

```
if (received_nonce >= current_nonce)
{
accept_message( );
current_nonce = received_nonce;
}
else
reject _message( );
```

In cases where stale data are not dangerous, as in the case of statistical or actuarial data, older nonces (if not already used) may be accepted. In this case, the receiver may store a data structure of skipped nonces that can later be processed. This may provide for out-of-order processing for some species of messages, as illustrated in pseudocode

```
if (received_nonce > current_nonce)
{
  if(skipped(received_nonce))
    accept_message( );
  else
    reject_message( );
}
```

In another example, any mismatch in nonce values may result in messages being rejected. This more rigid structure is less tolerant of legitimate (i.e., non-malicious) failure modes but may provide more robust security.

In an embodiment, all devices may reset their nonce counters at reboot. Thus, at initial boot, all counters may be synchronized to zero. For example, nonce counters may be stored in volatile memory, as with symmetric encryption keys. If any devices get out of sync with one another, they may resynchronize at boot time.

Depending on the embodiment, senders and receivers may need to account for wraparound in the nonce counter. For example, a counter of 16 bits or less may require wraparound processing to prevent saturation of the counter.

However, wraparound processing may be unpreferred in some cases because an attacker could wait for the counter to wrap around and then begin replaying messages.

For context, an example device may send one message per millisecond. Real devices may send messages much more or much less frequently than once per millisecond. The example device, if using a 16-bit unsigned nonce field, would wrap around after approximately one minute. With a 32-bit counter, the device would wrap around after approximately 50 days, which is greater than the expected time between reboots. With a 64-bit counter, the device would wrap around at approximately 600 million years, which exceeds the expected life cycle of the AV.

In cases of a large-enough nonce field (e.g., 64 bits), the nonce value may be stored in non-volatile memory and not reset at boot. In this case, there may be a protocol for the devices to sync their nonce values at boot, such as the receiver syncing to the nonce value of the first signed, valid message received after boot.

The foregoing can be used to build or embody several example implementations according to the teachings of the present specification. Some example implementations are included here as nonlimiting illustrations of these teachings.

DETAILED DESCRIPTION OF THE DRAWINGS

A system and method for providing short-lived, symmetric cryptographic keys within an AV will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram 100 illustrating an example AV 102. AV 102 may be, for example, an automobile, car, truck, bus, train, tram, funicular, lift, or similar. AV 102 could also be an autonomous aircraft (fixed wing, rotary, or tiltrotor), ship, watercraft, hover craft, hydrofoil, buggy, cart, golf cart, recreational vehicle, motorcycle, off-road vehicle, three- or four-wheel all-terrain vehicle, or other vehicle. Except to the extent specifically enumerated in the appended claims, the present specification is not intended to be limited to a particular vehicle or vehicle configuration.

In this example, AV 102 includes one or more sensors, such as sensor 108-1 and sensor 108-2. Sensors 108 may include, by way of illustrative and nonlimiting example, localization and driving sensors such as photodetectors, cameras, radio detection and ranging (RADAR), SONAR, light detection and ranging (LIDAR), GPS, inertial measurement units (IMUS), synchros, accelerometers, microphones, strain gauges, pressure monitors, barometers, thermometers, altimeters, wheel speed sensors, computer vision systems, biometric sensors for operators and/or passengers, or other sensors. In some embodiments, sensors 108 may include cameras implemented using high-resolution imagers with fixed mounting and field of view. In further examples, sensors 108 may include LIDARs implemented using scanning LIDARs. Scanning LIDARs have a dynamically configurable field of view that provides a point-cloud of the region intended to scan. In still further examples, sensors 108 includes RADARs implemented using scanning RADARs with dynamically configurable field of view.

AV 102 may further include one or more actuators 112. Actuators 112 may be configured to receive signals and to carry out control functions on AV 102. Actuators may include switches, relays, or mechanical, electrical, pneumatic, hydraulic, or other devices that control the vehicle. In various embodiments, actuators 112 may include steering actuators that control the direction of AV 102, such as by turning a steering wheel, or controlling control surfaces on an air or watercraft. Actuators 112 may further control motor functions, such as an engine throttle, thrust vectors, or others. Actuators 112 may also include controllers for speed, such as an accelerator. Actuators 112 may further operate brakes, or braking surfaces. Actuators 112 may further control headlights, indicators, warnings, a car horn, cameras, or other systems or subsystems that affect the operation of AV 102.

A controller 104 may provide the main control logic for AV 102. Controller 104 is illustrated here as a single logical unit and may be implemented as a single device such as an electronic control module (ECM) or other. In various embodiments, one or more functions of controller 104 may be distributed across various physical devices, such as multiple ECMs, one or more hardware accelerators, artificial intelligence (AI) circuits, or other.

Controller 104 may be configured to receive from one or more sensors 108 data to indicate the status or condition of AV 102, as well as the status or condition of certain ambient factors, such as traffic, pedestrians, traffic signs, signal lights, weather conditions, road conditions, or others. Based on these inputs, controller 104 may determine adjustments to be made to actuators 112. Controller 104 may determine adjustments based on heuristics, lookup tables, AI, pattern recognition, or other algorithms.

Various components of AV 102 may communicate with one another via a bus such as controller area network (CAN) bus 170. CAN bus 170 is provided as an illustrative embodiment, but other types of buses may be used, including wired, wireless, fiberoptic, infrared, Wi-Fi, Bluetooth, dielectric waveguides, or other types of buses. Bus 170 may implement any suitable protocol. for example, in some cases bus 170 may use transmission control protocol (TCP) for connections that require error correction. In cases where the overhead of TCP is not preferred, bus 170 may use a one-directional protocol without error correction, such as UDP. Other protocols may also be used. Lower layers of bus 170 may be provided by protocols such as any of the family of institute of electrical and electronics engineers (IEEE) 802 family of communication protocols, including any version or subversion of 802.1 (higher layer LAN), 802.2 (logical link control), 802.3 (Ethernet), 802.4 (token bus), 802.5 (token ring), 802.6 (metropolitan area network), 802.7 (broadband coaxial), 802.8 (fiber optics), 802.9 (integrated service LAN), 802.10 (interoperable LAN security), 802.11 (wireless LAN), 80.12 (100VG), 802.14 (cable modems), 802.15 (wireless personal area network, including Bluetooth), 802.16 (broadband wireless access), or 802.17 (resilient packet ring) by way of illustrative and nonlimiting example. Non-IEEE and proprietary protocols may also be supported, such as for example, InfiniBand, FibreChannel, FibreChannel over Ethernet (FCoE), Omni-Path, Lightning bus, or others. Bus 170 may also enable controller 104, sensors 108, actuators 112, and other systems and subsystems of AV 102 to communicate with external hosts, such as internet-based hosts. In some cases, AV 102 may form a mesh or other cooperative network with other AVs, which may allow sharing of sensor data, control functions, processing ability, or other resources.

Figure 9:
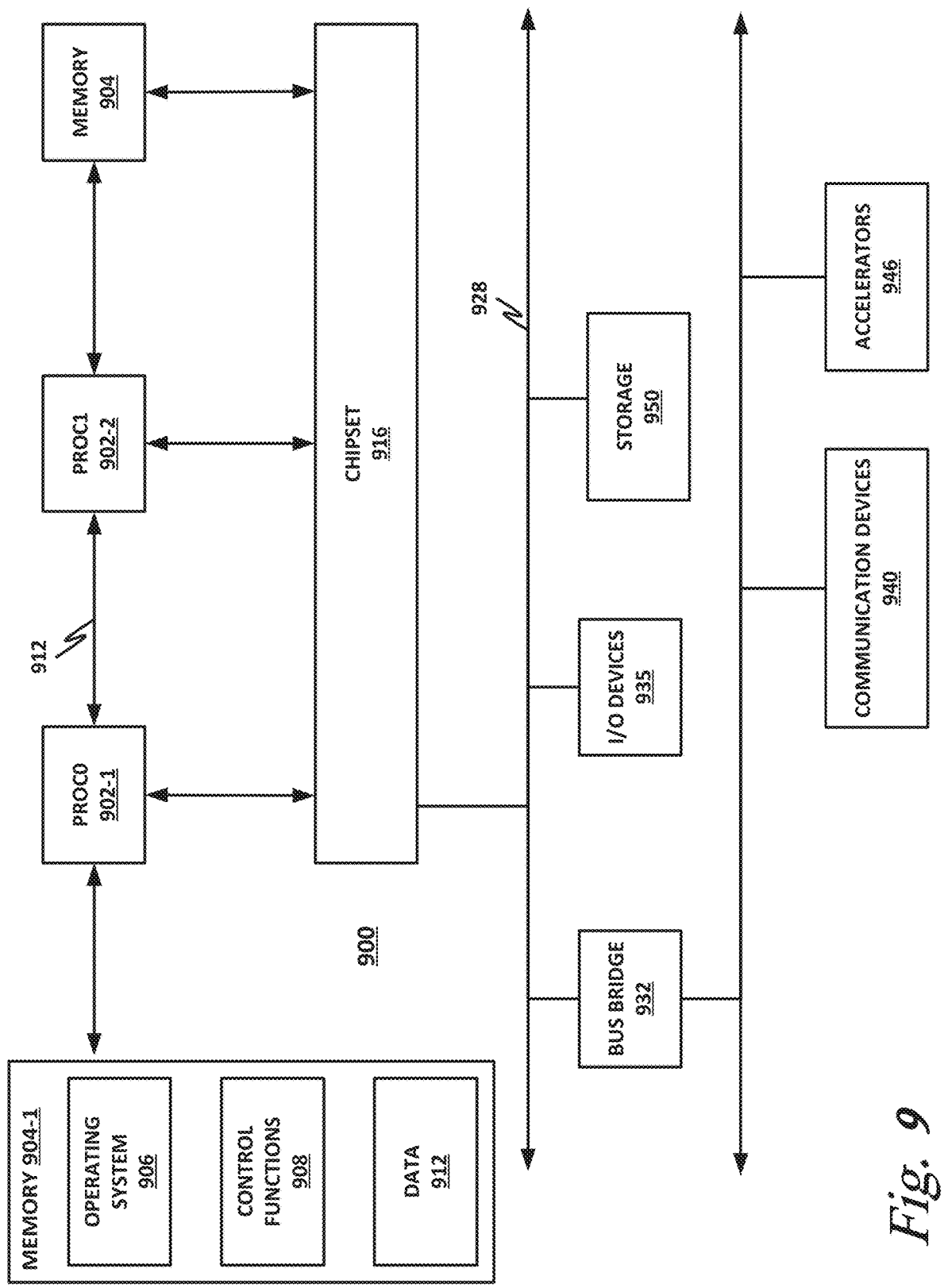
FIG. 9 is a block diagram of a hardware platform.

Controller 104 may control the operations and functionality of AVs 102, or one or more other AVs. Controller 104 may receive sensed data from sensors 108, and make onboard decisions based on the sensed data. In some cases, controller 104 may also offload some processing or decision making, such as to a cloud service or accelerator. In some cases, controller 104 is a general-purpose computer adapted for I/O communication with vehicle control systems and sensor systems. Controller 104 may be any suitable computing device. An illustration of a hardware platform is shown in FIG. 9, which may represent a suitable computing platform for controller 104. In some cases, controller 104 may be connected to the internet via a wireless connection (e.g., via a cellular data connection). In some examples, controller 104 is coupled to any number of wireless or wired communication systems. In some examples, controller 104 is coupled to one or more communication systems via a mesh network of devices, such as a mesh network formed by AVs.

According to various implementations, AV 102 may modify and/or set a driving behavior in response to parameters set by vehicle passengers (e.g., via a passenger interface) and/or other interested parties (e.g., via a vehicle coordinator or a remote expert interface). Driving behavior of an AV may be modified according to explicit input or feedback (e.g., a passenger specifying a maximum speed or a relative comfort level), implicit input or feedback (e.g., a passenger's heart rate), or any other suitable data or manner of communicating driving behavior preferences.

AV 102 is illustrated as a fully autonomous automobile but may additionally or alternatively be any semi-autonomous or fully AV. In some cases, AV 102 may switch between a semi-autonomous state and a fully autonomous state and thus, some AVs may have attributes of both a semi-AV and a fully AV depending on the state of the vehicle.

Figure 2:
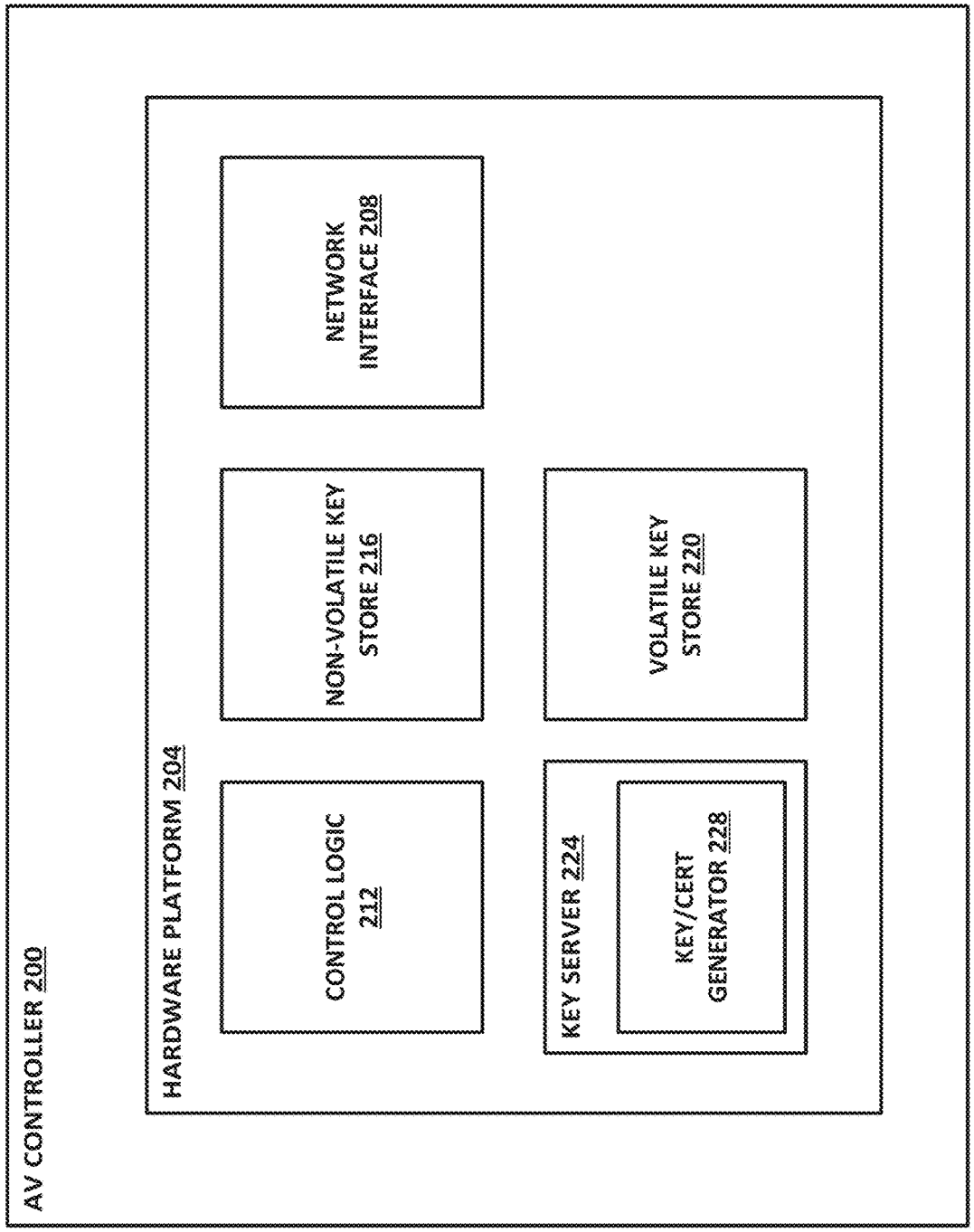
FIG. 2 is a block diagram of an AV controller.

FIG. 2 is a block diagram of an AV controller 200. AV controller 200 may be a main controller for an autonomous vehicle. AV controller 200 may collect inputs from various sensors and transducers and make decisions based on those inputs. AV controller 200 may then drive a plurality of actuators that execute the control decisions. In some examples, for redundancy, a plurality of AV controllers 200 may be provided within a single AV.

AV controller 200 includes a hardware platform 204. Hardware platform 204 may, for example, be a hardware platform such as the one illustrated in FIG. 9 below. Hardware platform 204 provides the necessary hardware and software infrastructure for AV controller 200 to perform its designated functions. In this illustrative example, those designated functions may include control logic 212, non-volatile key storage 216, volatile key storage 220, and a key server 224. Hardware platform 204 may also include or provide a network interface 208. In addition to the necessary hardware interfaces, network interface 208 may also provide appropriate software and/or firmware interfaces, such as the various layers of popular seven-layer network protocols. Network interface 208 may include one or more physical interfaces and/or one or more logical interfaces. For example, network interface 208 may communicatively couple AV controller 200 to a plurality of devices on the AV, such as via a CAN bus or similar vehicle bus. Network interface 208 may also communicatively couple AV controller 200 to an external network, such as the internet. This may be via a wireless or cellular network or via a temporary hardwired network that is used to communicate with AV controller 200.

Control logic 212 may include one or more hardware and/or software engines that may enable AV controller 200 to make and execute decisions for the autonomous vehicle. For example, control logic 212 may collect position, road condition, obstruction, and traffic data and, based on those data, may determine a speed, direction, and other inputs for the AV. Control logic 212 may also include interfaces or APIs to carry out those control decisions, such as by actuating various actuators.

As illustrated throughout this specification, control logic 212 may beneficially be able to trust data from its various input sensors and may provide trusted control outputs to the actuators. This trust model may be important to ensuring proper operation of the AV. To that end, control logic 212 may include logic for verifying certificates attached to UDP messages received via the CAN bus. As the various sensors stream their data to AV controller 200, control logic 212 checks these certificates against symmetric cryptographic keys stored in non-volatile key storage 216. If the signatures affixed to these messages can be correctly verified via the symmetric cryptographic keys, then the messages may be trusted as genuine. As further described within this specification, to protect against replay attacks, cryptographic messages may also have nonce values appended thereto. The nonce value may increment with each message, and hardware platform 204 may include a nonce counter, such as a 32-bit or 64-bit nonce counter, that control logic 212 increments with each message received. A separate nonce counter may be used for each device that communicates with AV controller 200. The devices are also expected to increment the nonce counter with each message sent so that the nonce counter appended to a message should match the internal nonce counter of control logic 212. If the nonce counters match, then AV controller 200 may be confident that the message is valid because it has a valid certificate and that the message was not replayed because the nonce counter matches. This helps AV controller 200 to ensure that incoming messages are genuine.

When sending control signals to actuators, control logic 212 may also maintain an internal nonce counter for each target actuator. When AV controller 200 streams control messages to these actuators, it increments its internal nonce counter with each message and signs each message with a symmetric encryption key designated for the target actuator. This may help the target actuator to establish trust with the control messages.

In some embodiments, the symmetric encryption keys may be kept in a volatile key store 220. Volatile key store 220 may be used to store symmetric encryption keys with the advantageous result that the symmetric encryption keys are wiped at boot. Once power is removed from volatile key store 220, all stored symmetric encryption keys are discarded. This provides, by design, a short-lived key infrastructure, which makes it difficult for an attacker to compromise a key store and perform useful work before the symmetric cryptographic keys are lost.

AV controller 200 also includes a non-volatile key store.

AV controller 200 may also include a non-volatile key store 216. Non-volatile key store 216 provides longer term storage of certain types of keys. For example, AV controller 200 may require a certificate issued by a trusted CA to perform the initial mTLS authentication that devices use to authenticate to one another and to provision matching symmetric cryptographic keys. It may not be desirable to wipe this trusted certificate at every reboot, but rather it may be desirable for the certificate for the external CA to have a predetermined expiry and to be refreshed on a schedule. Advantageously, this may help to ensure that the AV can continue operating in the case of a reboot where a trusted CA is not immediately available (e.g., if the AV is temporarily in a rural or other location where a wireless or cellular network is not available). If the certificates issued by the trusted CA were purged at every boot (as are the symmetric cryptographic keys), then the AV may be unable to operate if a reboot occurs in an area without cellular coverage. Thus, it may be preferable for devices to refresh their trusted CA certificates at a more convenient time, such as when they are near expiring and when a cellular network is available.

In some embodiments, AV controller 200 may also include a key server 224. In other embodiments, key server 224 may be a separate computing device that operates on the same CAN bus as AV controller 200. For redundancy, AV controller 200 may be replicated in the AV. For example, an illustrative AV may include four redundant AV controllers 200, which provide identical control functions. Thus, if one or more AV controllers fails, the other AV controller or controllers can take over control of the vehicle, thus preserving autonomy. However, it may not be necessary in every case to replicate key server 224 across every AV controller. For example, only the primary (e.g., "leader") AV controller may include key server 224, while secondary (e.g., "follower") AV controllers may lack a key server 224.

Key server 224 may include a key/certificate generator 228. In operation, when the system boots, the various devices throughout the system may query key server 224 for symmetric cryptography certificates that can be used to communicate with one another and to sign messages. Before providing a key and/or certificate, key server 224 may first authenticate the requesting device. For example, mTLS may be used, with certificates issued by a trusted CA, for the AV controller 200 and the requesting device to authenticate to each other. Once the devices have authenticated to each other, AV controller 200 may query volatile key store 220 to see if it has already generated a matching key for another device that the requesting device is expected to communicate with. Because the devices use symmetric key cryptography, it may be necessary to provision the same symmetric key to devices that communicate with each other. If a symmetric key for the same communication has already been provisioned to another device, then key server 224 provisions that same symmetric key to the requesting device that is expected to be on the other side of the communication.

If no matching keys are found for devices that are requested to communicate with the requesting device, then key server 224 operates key generator 228 to generate a new symmetric encryption key for the requesting device. The newly generated key may then be stored in volatile key store 220, for example, in a data structure that identifies devices that are expected to communicate with one another. If later another device that is expected to communicate with the first requesting device requests a symmetric encryption key, that same symmetric encryption key may be provisioned to the second device.

Figure 3:
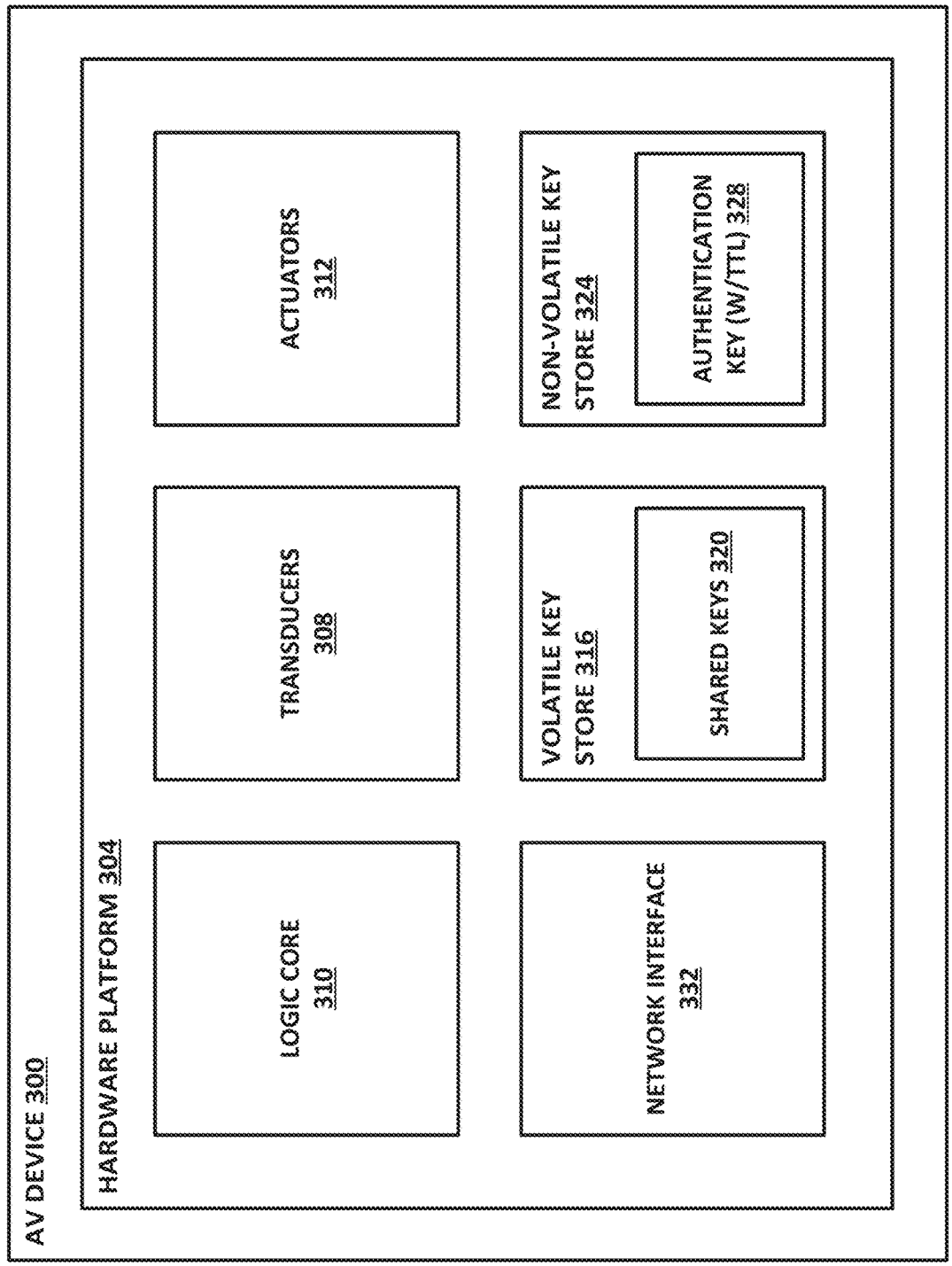
FIG. 3 is a block diagram of an AV device.

FIG. 3 is a block diagram of an AV device 300. AV device 300 may be a sensor, a communication device, a display device, a user interface, an actuator, or any other device that operates on the AV. In some cases, AV device 300 may be required to communicate data with other devices on the AV. To ensure integrity of communicated messages, AV device 300 may use the symmetric key cryptography discussed throughout this specification.

AV device 300 may be based on a hardware platform 304. Hardware platform 304 may be an example or an embodiment of a hardware platform, such as the one illustrated in FIG. 9 below. Notably, for some AV devices 300, only a minimal hardware platform may be provided to perform the necessary function of the device. For example, a sensor may include a transducer along with a very lightweight hardware computing platform to read values from the transducer and to provide the communication. Other AV devices may have more full-fledged hardware platforms.

In this example, AV device 300 includes various functions, such as a logic core 310, one or more transducers 308, one or more actuators 312, one or more network interfaces 332, one or more volatile key stores 316, and one or more non-volatile key stores 324. Depending on the nature of the device, some of these functions may be omitted, while other functions may be provided.

Logic core 310 includes a processor, such as a central processor units (CPU), DSP, or similar, that provides the logic for AV device 300. Transducers 308 may be used to read data from the ambient environment, such as to provide a sensor for the AV. Actuators 312 may be provided to control certain functions mechanically, electronically, or logically. Depending on the nature of AV device 300, it may include transducers 308, actuators 312, or both. Logic core 310 may include digital-to-analog and/or analog-to-digital converters. For example, transducers 308 may convert analog data to digital for use within logic core 310. Logic core 310 may also provide a digital-to-analog converter to drive actuators 312. Other configurations are also possible.

Network interface 332 enables AV device 300 to communicate with other devices, such as on the CAN bus or external devices via an internet connection. As in the case above, AV device 300 may preferably verify messages received from other devices and certify messages sent to other devices. Thus, volatile key store 316 may include one or more shared keys 320. As a security practice, volatile key store 316 may include a different shared key for each discrete communication. For example, in point-to-point communications, only two devices may be considered, namely the sender and the receiver. For security, the same symmetric encryption key may be provided only to that sender and receiver. If AV device 300 sends data to three different devices in three different point-to-point connections, then it may be desirable to have three different symmetric encryption keys for each of those point-to-point communications. Similarly, if AV device 300 receives data from another two devices in a point-to-point configuration, it may be preferable to have two different encryption keys for each of those two devices, which keys may be separate from and different from the keys used for sending point-to-point communications. In some cases, the sharing of keys may imply an equivalent level of trust, and thus it may be preferable to provide different keys for each point-to-point communication. This provisioning of keys may be controlled by the key server, such as the key server located on AV controller 200 of FIG. 2.

In the case that AV device 300 needs to broadcast certain data to a plurality of receivers, then each of those receivers may receive the same symmetric encryption key for the broadcast communication.

AV device 300 also includes a non-volatile key store 324. This may include an authentication key or certificate 328, which may be used for initial authentication. For example, when the device first boots, AV device 300 may perform an initial mTLS authentication with the key server. This enables the key server and the device to trust one another. After this mTLS authentication is successful, AV device 300 may request one or more symmetric encryption keys from the key server. AV device 300 receives the symmetric encryption keys and may store them in volatile key store 316. Advantageously, at a reboot, any keys stored in volatile key store 316 are lost from memory and new keys will be provisioned. This may help to preserve the security of the system.

Figure 4:
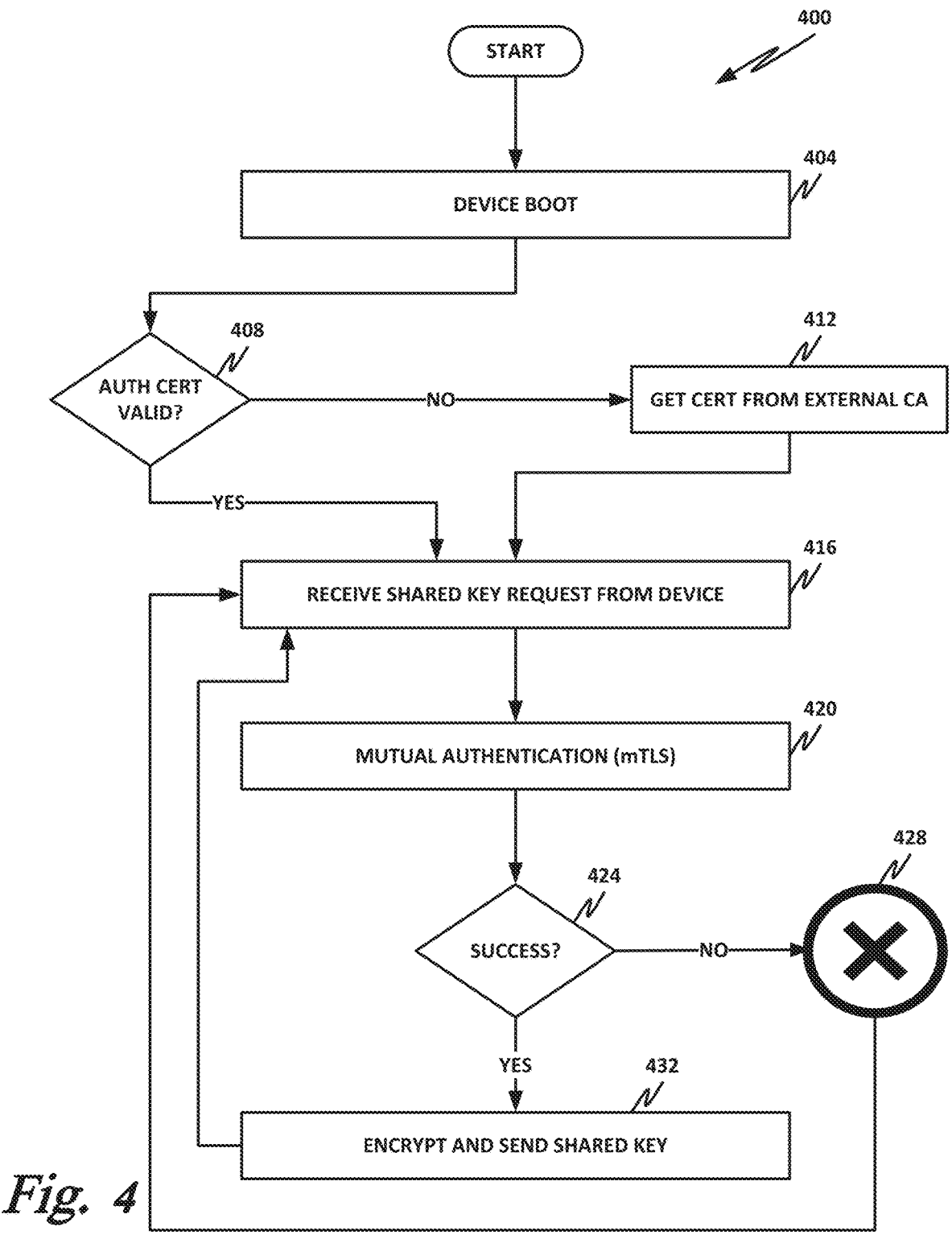
FIG. 4 is a flowchart of a method that may be performed, for example, by a key server of an AV.

FIG. 4 is a flowchart of a method 400 that may be performed, for example, by a key server of an AV.

In block 404, the device boots. Upon device boot, in block 408, the key server checks whether its current authentication certificate is valid and unexpired. For example, the key server may have previously received from a trusted CA an authentication certificate. If that authentication certificate has expired or is close to expiring or is within a threshold of expiring, then the key server may need to get a new certificate. If the certificate is valid, expired, or nearly expired, then in block 412, the system communicates with an external trusted CA to get a valid certificate from the trusted CA. The AV controller and each of the AV devices may have stored thereon the public key of the CA, which will enable them to validate certificates issued by the trusted CA.

If the current authentication certificate is valid, or alternatively after getting a fresh authentication certificate from the external CA, in block 416, the key server may receive a shared key request from a device of the AV. This could be, for example, the AV controller, any of the various sensors, transducers, controllers, actuators, or other systems or subsystems of the AV device.

In block 420, the key server attempts to perform mutual authentication with the requesting device. For example, mTLS or some other mutual authentication scheme may be used.

In block 424, the key server checks to make sure that the mutual authentication was successful.

If mutual authentication was not successful, then in block 428, there is an error condition. For example, an untrusted or misconfigured device may be attempting to retrieve a cryptographic key from the key server. In response to the error condition, the key server may log the error, notify an administrator, raise an alarm, or take some other action.

Returning to decision block 424, if the mutual authentication was successful, then in block 432, the key server may use the session key derived from the mTLS session to encrypt the symmetric key for the device. The key server may then send the symmetric key to the other device, and in block 416, may continue waiting for new key requests.

Note that, in block 432, the key server may also check a data structure to determine which other devices the requesting device communicates with. If the requesting device is requesting a symmetric encryption key for a communication channel for which another key has already been provisioned to a different device, the key server may provision the same key to the requesting device. This ensures that the devices on both ends of the communication channel have the same encryption key and are therefore able to use symmetric encryption or cryptographic verification.

Figure 5:
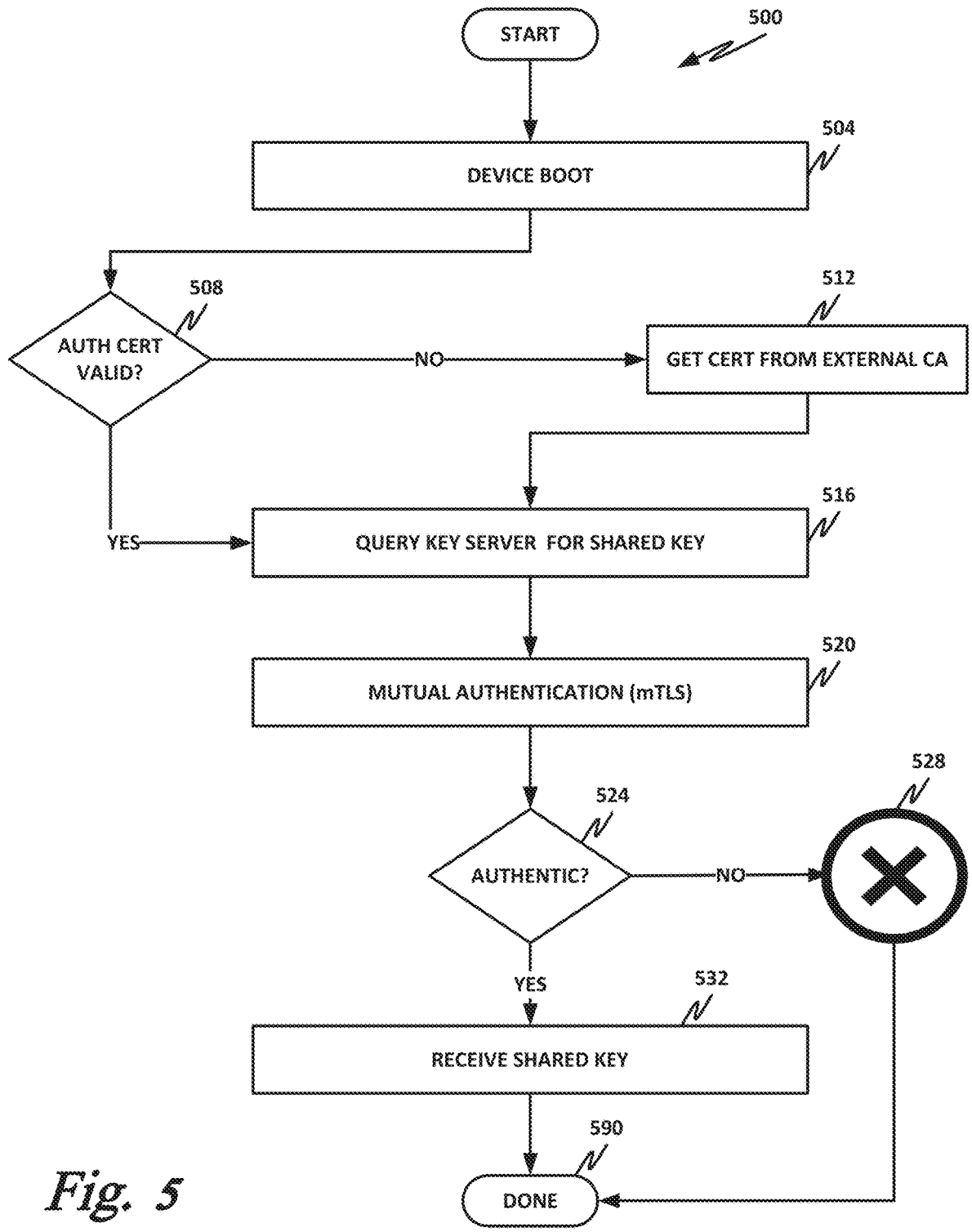
FIG. 5 is a flowchart of a method that may be performed, for example, by an AV device.

FIG. 5 is a flowchart of a method 500 that may be performed, for example, by an AV device.

Starting in block 504, the AV device boots, such as upon a system reboot.

In block 508, the device checks to see whether its authentication certificate is valid and unexpired. If the authentication certificate is invalid, expired, near expiration, or within a threshold of expiration, the device may need to first retrieve a new certificate before continuing. In that case, the device may query the trusted external CA and get a fresh certificate. Thus, after block 508 or after block 512, the device may be expected to have a valid and unexpired cryptographic certificate issued from the CA.

In block 516, the device queries the key server for one or more shared keys that the device may need for communications that it performs on the AV.

In block 520, a mutual authentication is performed between the device and the key server. As above, this may take the form of mTLS, in which the server and the client exchange cryptographic certificates issued by the trusted CA, and both use the public key of the trusted CA to verify those cryptographic certificates. In some cases, such as the case where the requesting device and the key server are on the same physical device (e.g., in the case where the key server is hosted on the AV controller), mTLS may be unnecessary because there are no external communication channels to compromise. In that case, internal APIs could be used for mutual authentication and for requesting certificates.

In block 524, the device determines whether the mTLS was successful and whether the key server was successfully authenticated.

In block 528, if the mTLS authentication was not successful, then an error condition occurs. As before, in response to the error condition, the device could raise an alarm, create a log, notify an administrator, or take some other action.

Returning to decision block 524, if the key server is authenticated successfully, then in block 532, the device receives from the key server the shared key. The shared key may be encrypted using the TLS session key established during the mTLS authentication. Thus, the device may use the session to decrypt the shared symmetric key so that the shared symmetric key can be stored locally, such as in a volatile key store. In some cases, the requesting device may communicate with more than one device, including a plurality of centers and/or receivers. In that case, the requesting device may need to receive a separate, symmetric cryptographic key for each communication channel. If the device broadcasts to a plurality of devices, then it may need only one key for the broadcast channel.

In block 590, the method is done.

Figure 6:
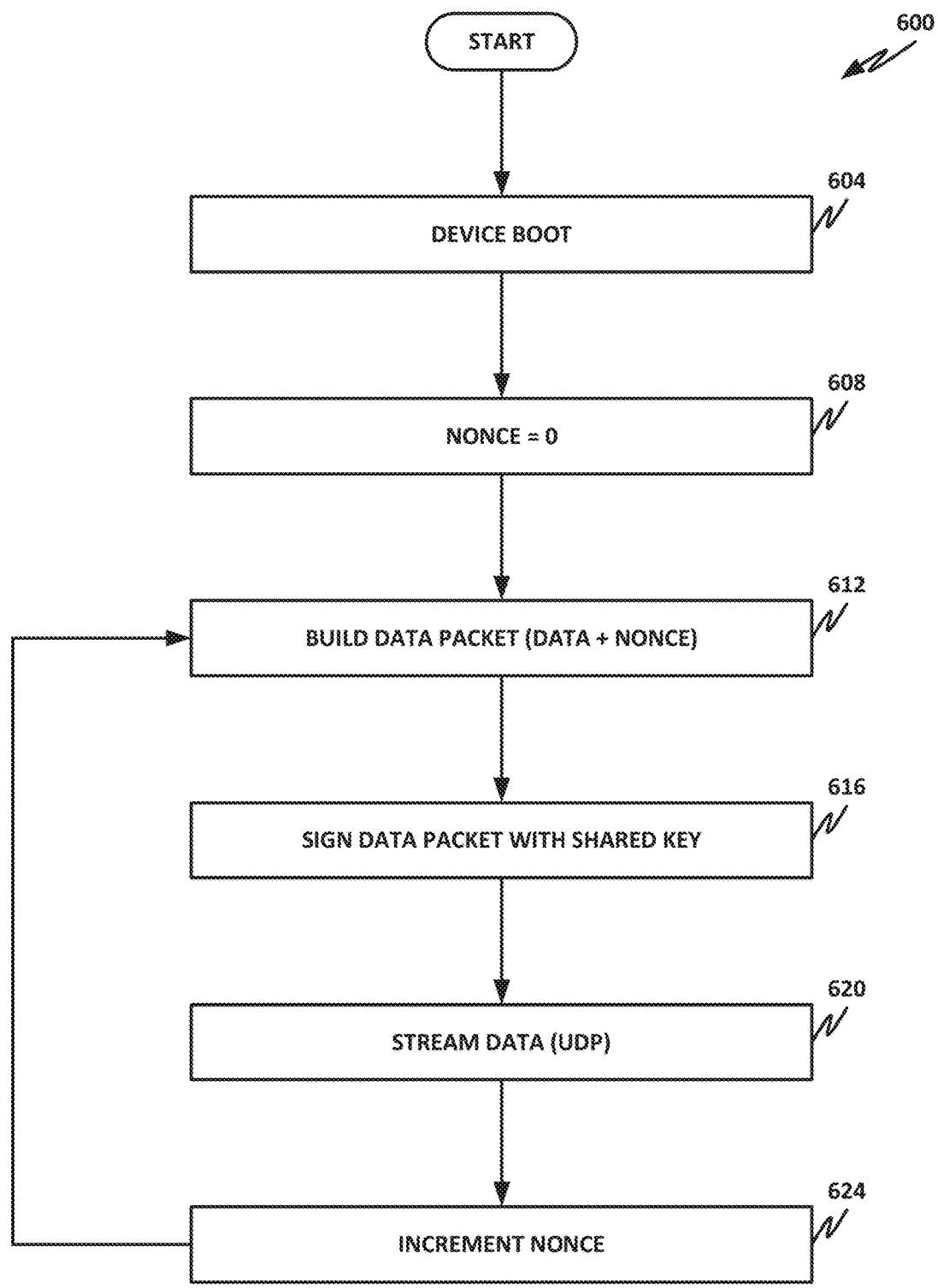
FIG. 6 is a flowchart of a method that may be performed by an AV device in communicating data on a network.

FIG. 6 is a flowchart of a method 600 that may be performed by an AV device in communicating data on the network. For example, the AV device may communicate via the CAN bus and may provide encrypted and/or signed messages that can be secured and/or verified by the receiver.

In block 604, the device boots and provisions the necessary cryptographic key or keys for its communications.

In block 608, the device may initialize a nonce counter to zero or some other known initial value. In the case of a 64-bit nonce counter, it is reasonable that the nonce value may be stored in non-volatile memory and initialized to the last nonce value used. The choice of whether to initialize the nonce to zero or to keep a running count may be a design-time selection. In some cases, there may be benefits in initializing the nonce, such as the case where a sender and receiver may get out of sync, which can be cured by rebooting the system so that the nonce counters are both reset.

In block 612, in the course of performing its function, the device may collect data, make decisions, or take other actions that require the device to send data to another device within the AV. The device may build a data packet which includes the data packet proper with the nonce value appended, prepended, or otherwise affixed to the data packet.

In block 616, the device may sign the data packet (including the appended nonce) using the shared cryptographic key. This may include, for example, taking a hash of the combination of the data packet and the nonce value and then cryptographically signing the hash. This ensures that only the true packet in combination with the correct nonce value (to within a mathematically sufficient assurance) will result in the correct signature. This helps to prevent replay attacks wherein an attacker could replay old values on the CAN bus.

In block 620, the device streams the data out to the receiver device. This may include, for example, sending the packet as a UDP packet or as some other type of packet, such as TCP or a different protocol.

In block 624, the device increments the nonce and is then prepared to build and send the next data packet.

Figure 7:
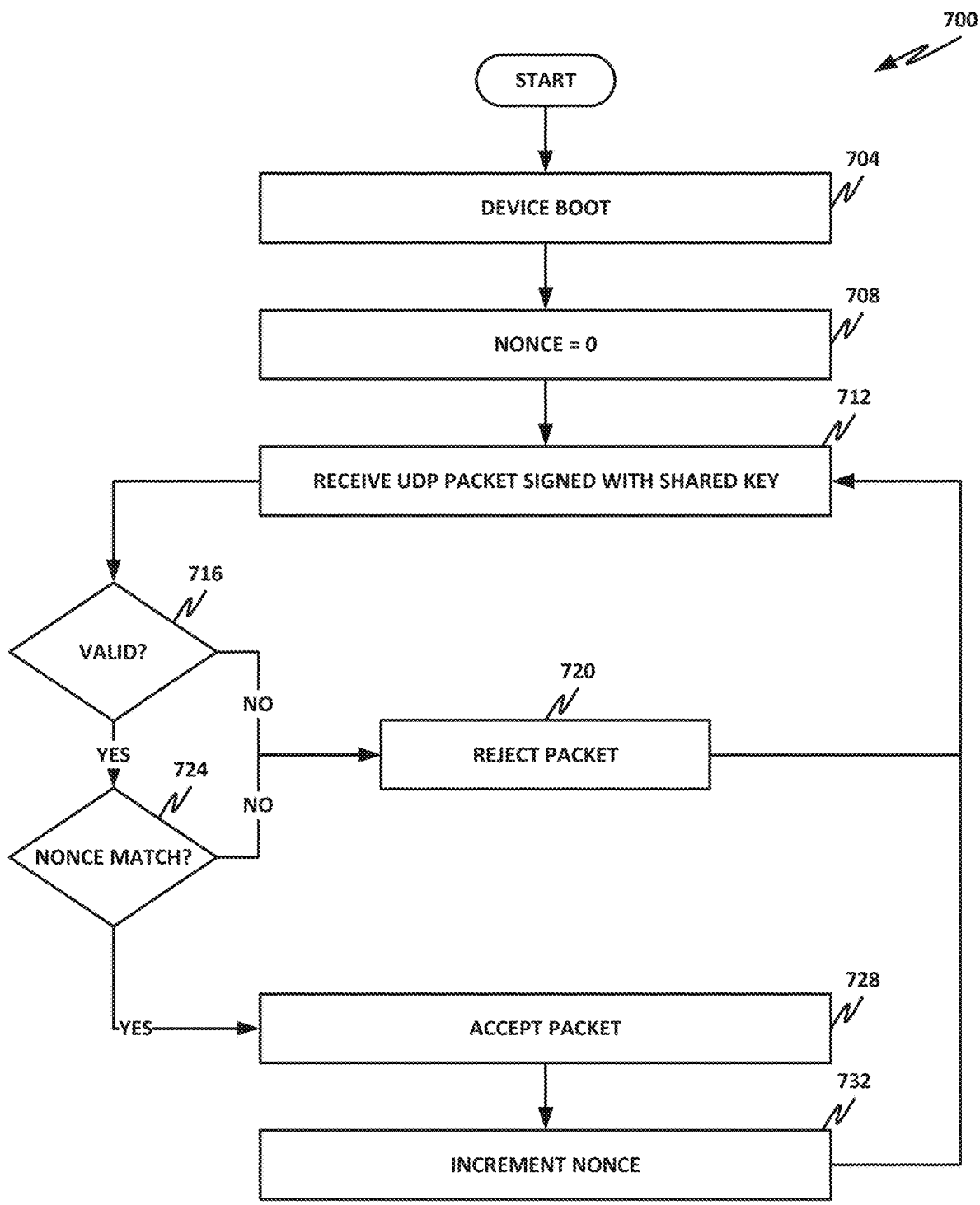
FIG. 7 is a flowchart of a method that may be performed by a receiver device in an AV.

FIG. 7 is a flowchart of a method 700 that may be performed by a receiver device in an AV.

In block 704, receiver device may boot or reboot.

In block 708, the receiver device may initialize the nonce to an appropriate value, such as zero. As before, with a sufficiently large nonce counter, there may be no need to reinitialize the nonce, and a nonce counter could be stored in a non-volatile memory. In the case of a non-volatile nonce, it may be desirable for the sender and receiver to perform an initial synchronization of the nonce values to ensure that the nonce values are correct and that messages will be accepted.

In block 712, the receiver device receives from the sender device a UDP packet signed with this shared symmetric key. As described throughout this specification, the shared key may be a asymmetric key that has been provisioned to both the sender and receiver by the key server at boot time. Because the sender and receiver share the same symmetric encryption key, they can both use the same key to encrypt or decrypt messages or to sign and verify messages.

In decision block 716, the receiver device first checks the signature against the shared key to determine whether the signature is valid.

If the signature is invalid, then in block 720, the receiver device may reject the packet. In some cases, the receiver device may take additional actions such as logging the rejection, raising an alarm, notifying an administrator, or taking some other action.

Returning to decision block 716, if the packet does have a valid signature, then in block 724, the receiver device may also check the nonce value to determine whether the nonce value matches the receiver device's internal nonce counter. Depending on the design considerations, an exact nonce match may or may not be necessary. For example, in some stricter security regimens, an exact nonce may be required. In other cases, it may be anticipated with a UDP stream that some packets may be dropped or lost. Thus, the receiver device may at least check to see whether the provided nonce value is greater than or equal to the internal nonce counter. If it is greater than the internal nonce counter, then in some cases, the packet may be accepted and the internal nonce counter may be set to the nonce value within the packet.

As before, if the nonce value is invalid, then in block 720, the message may be rejected and appropriate additional action may optionally be taken. Returning to decision block 724, if the nonce value is correct, then in block 728, the receiver device accepts the message. The receiver device may then take appropriate action on the message, such as performing its intended function.

In block 732, the receiver device may increment the nonce value so that the nonce value may be expected to match the next incoming message.

Figure 8:
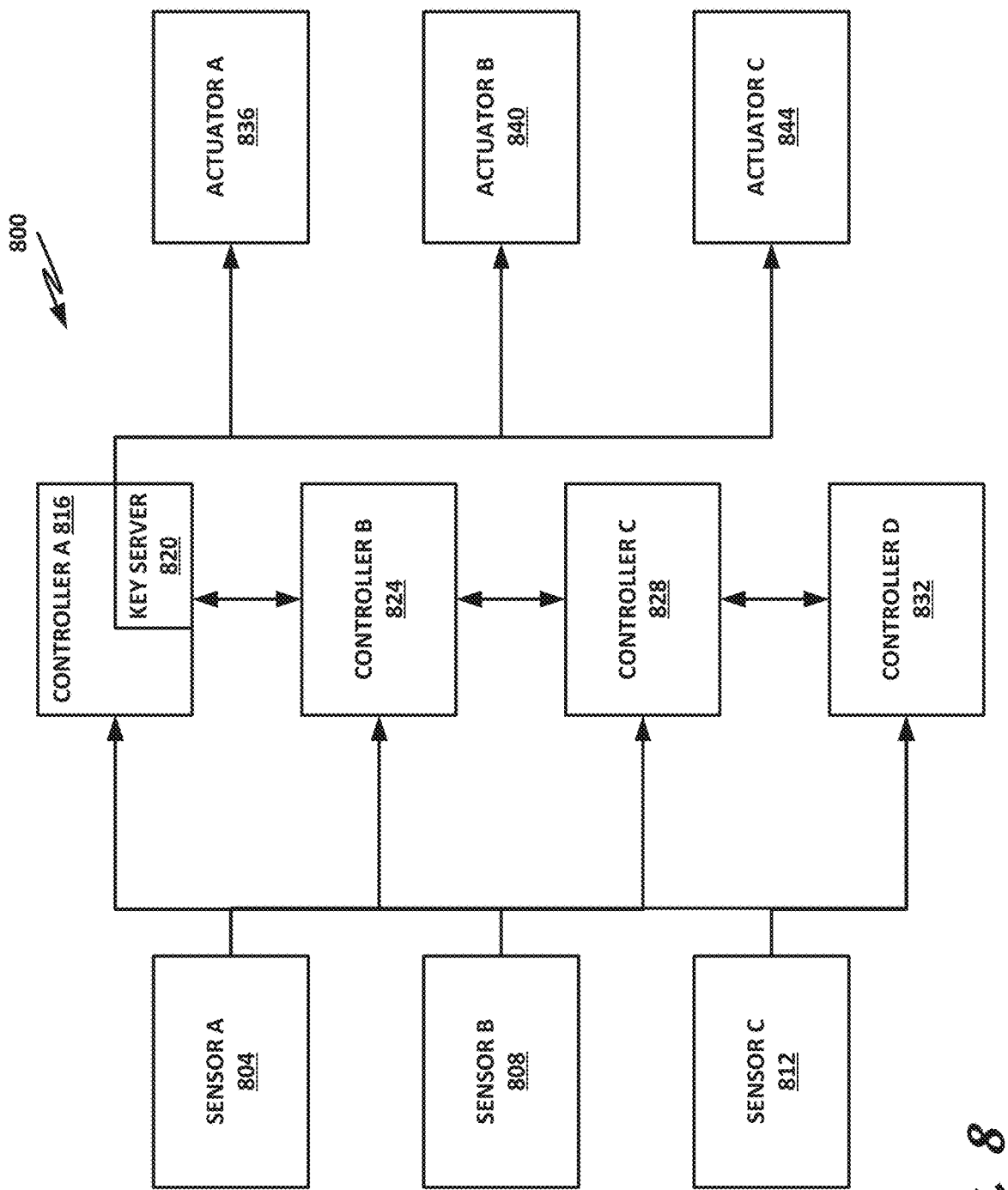
FIG. 8 is a block diagram of selected elements of an AV.

FIG. 8 is a block diagram 800 of selected elements of an AV.

In block diagram 800, a plurality of sensors are illustrated, namely sensor A 804, sensor B 808, and sensor C 812. These three sensors may stream data to a plurality of redundant controllers, namely controller A 816, controller B 824, controller C 828, and controller D 832. These four controllers may be provided for the purpose of redundancy. If one controller fails, then another controller may take over its function to continue to provide control for the car. In this case, only one controller, namely controller A 816, may be provisioned with a key server 820. This is an illustrative use case only, and other configurations are also possible, including the case were key server 820 is replicated across multiple controllers or all four controllers.

Controller A 816 may have current control of the AV and provides outputs to actuator A 836, actuator B 840, and actuator C 844.

To enable secure and verified communication between the various devices illustrated here, key server 820 may provision symmetric encryption keys to the various devices. For example, sensor A 804 may communicate with controller A 816, controller B 824, controller C 828, and controller D 832. This is similar to a broadcast configuration in which the four controllers all receive the same data packet from sensor A 804. Thus, key server 820 may provision the same cryptographic key to sensor A 804, on the one hand, and all four of controller A 816, controller B 824, controller C 828, and controller D 832, on the other hand. However, sensor B 808 may not be privy to that communication. Rather, sensor B 808 may have different communication channels to communicate with the four controllers. Thus, in at least one embodiment, key server 820 may not provision the same key to sensor B as is provisioned to sensor A. Rather, key server 820 may provision a different key to sensor B 808 and provision that key to any devices that are receivers of communications from sensor B 808.

Furthermore, if sensor A needs to send data to sensors C 812 that is different from the data broadcast to the four controllers, then a separate symmetric key may be provisioned for that communication channel and shared between sensor A 804 and sensor C 812.

In the case of controllers 816, 824, 828, and 832, the four devices may act as both senders and receivers. The controllers receive various sensor data from the sensors and send control commands to actuators such as actuator A 836, actuator B 840, and actuator C 844. Thus, taking controller A 816 as just one example, key server 820 may provision the following keys:

The same shared key may be provisioned to both sensor A 804 and controller A 816 for the communication channel for sensor A 804 sending data to controller A 816.

A different shared key may be provisioned to both sensor B 808 and controller A 816 for the communication channel for sensor B 808 to send data to controller A 816.

Yet another shared cryptographic key may be provisioned to both sensor C 812 and controller A 816 for the communication channel of sensor C 812 sending data to controller A 816.

Yet a different shared cryptographic key may be provisioned to both controller A 816 and actuator A 836 for the communication channel of controller A 816 sending data to actuator A 836.

Yet another shared cryptographic key may be provisioned to both controller A 816 and actuator B 840 for the communication channel of controller A 816 sending data to actuator B 840.

Yet another shared cryptographic key may be provisioned between controller A 816 and actuator C 844 for the communication channel of controller A 816 sending data to actuator C 844.

If controller A 816 also needs to perform bidirectional communication with controller B 824, controller C 828, and controller D 832, then additional shared cryptographic keys may be provisioned for each of those pairings.

FIG. 9 is a block diagram of a hardware platform 900. Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Hardware platform 900 may provide a suitable structure for controller 104 of FIG. 1, as well as for other computing elements illustrated throughout this specification, including elements external to AV 102. Depending on the embodiment, elements of hardware platform 900 may be omitted, and other elements may be included.

Hardware platform 900 is configured to provide a computing device. In various embodiments, a "computing device" may be or comprise, by way of nonlimiting example, a computer, system on a chip (SoC), workstation, server, mainframe, virtual machine (whether emulated or on a "bare metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol (IP) telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 900 is arranged in a point-to-point (PtP) configuration. This PtP configuration is popular for personal computer (PC) and server-type devices, although it is not so limited, and any other bus type may be used. The PtP configuration may be an internal device bus that is separate from CAN bus 170 of FIG. 1, although in some embodiments they may interconnect with one another.

Hardware platform 900 is an example of a platform that may be used to implement embodiments of the teachings of this specification. For example, instructions could be stored in storage 950. Instructions could also be transmitted to the hardware platform in an ethereal form, such as via a network interface, or retrieved from another source via any suitable interconnect. Once received (from any source), the instructions may be loaded into memory 904, and may then be executed by one or more processor 902 to provide elements such as an operating system 906, operational agents 908, or data 912.

Hardware platform 900 may include several processors 902. For simplicity and clarity, only processors PROC0 902-1 and PROC1 902-2 are shown. Additional processors (such as 2, 4, 8, 16, 24, 32, 64, or 128 processors) may be provided as necessary, while in other embodiments, only one processor may be provided. Processors may have any number of cores, such as 1, 2, 4, 8, 16, 24, 32, 64, or 128 cores.

Processors 902 may be any type of processor and may communicatively couple to chipset 916 via, for example, PtP interfaces. Chipset 916 may also exchange data with other elements. In alternative embodiments, any or all of the PtP links illustrated in FIG. 9 could be implemented as any type of bus, or other configuration rather than a PtP link. In various embodiments, chipset 916 may reside on the same die or package as a processor 902 or on one or more different dies or packages. Each chipset may support any suitable number of processors 902. A chipset 916 (which may be a chipset, uncore, Northbridge, Southbridge, or other suitable logic and circuitry) may also include one or more controllers to couple other components to one or more CPUs.

Two memories, 904-1 and 904-2 are shown, connected to PROC0 902-1 and PROC1 902-2, respectively. As an example, each processor is shown connected to its memory in a direct memory access (DMA) configuration, though other memory architectures are possible, including ones in which memory 904 communicates with a processor 902 via a bus. For example, some memories may be connected via a system bus, or in a data center, memory may be accessible in a remote DMA (RDMA) configuration.

Memory 904 may include any form of volatile or non-volatile memory including, without limitation, magnetic media (e.g., one or more tape drives), optical media, flash, random access memory (RAM), double data rate RAM (DDR RAM) non-volatile RAM (NVRAM), static RAM (SRAM), dynamic RAM (DRAM), persistent RAM (PRAM), data-centric (DC) persistent memory (e.g., Intel Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 904 may be used for short, medium, and/or long-term storage. Memory 904 may store any suitable data or information utilized by platform logic. In some embodiments, memory 904 may also comprise storage for instructions that may be executed by the cores of processors 902 or other processing elements (e.g., logic resident on chipsets 916) to provide functionality.

In certain embodiments, memory 904 may comprise a relatively low-latency volatile main memory, while storage 950 may comprise a relatively higher-latency non-volatile memory. However, memory 904 and storage 950 need not be physically separate devices, and in some examples may simply represent a logical separation of function (if there is any separation at all). It should also be noted that although DMA is disclosed by way of nonlimiting example, DMA is not the only protocol consistent with this specification, and that other memory architectures are available.

Certain computing devices provide main memory 904 and storage 950, for example, in a single physical memory device, and in other cases, memory 904 and/or storage 950 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Chipset 916 may be in communication with a bus 928 via an interface circuit. Bus 928 may have one or more devices that communicate over it, such as a bus bridge 932, I/O devices 935, accelerators 946, or communication devices, by way of nonlimiting example. In some cases, the elements of hardware platform 900 may be coupled together in any suitable manner. For example, a bus may couple any of the components together. A bus may include any known interconnect, such as a multi-drop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 940 can broadly include any communication not covered by a network interface and the various I/O devices described herein. This may include, for example, various universal serial bus (USB), FireWire, Lightning, or other serial or parallel devices that provide communications. In a particular example, communication device 940 may be used to stream and/or receive data within a CAN. For some use cases, data may be streamed using UDP, which is unidirectional and lacks error correction. UDP may be appropriate for cases where latency and overhead are at a higher premium than error correction. If bidirectional and/or error corrected communication are desired, then a different protocol, such as TCP may be preferred.

I/O Devices 935 may be configured to interface with any auxiliary device that connects to hardware platform 900 but that is not necessarily a part of the core architecture of hardware platform 900. A peripheral may be operable to provide extended functionality to hardware platform 900 and may or may not be wholly dependent on hardware platform 900. In some cases, a peripheral may itself be a. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

Bus bridge 932 may be in communication with other devices such as a keyboard/mouse 938 (or other input devices such as a touch screen, trackball, etc.), communication devices 940 (such as modems, network interface devices, peripheral interfaces such as PCI or PCIe, or other types of communication devices that may communicate through a network), a data storage device, and/or accelerators 946. In alternative embodiments, any portions of the bus architectures could be implemented with one or more PtP links.

Operating system 906 may be, for example, Microsoft Windows, Linux, UNIX, Mac OS X, iOS, MS-DOS, or an embedded or real-time operating system (including embedded or real-time flavors of the foregoing). For real-time systems such as an AV, various forms of QNX are popular. In some embodiments, a hardware platform 900 may function as a host platform for one or more guest systems that invoke application (e.g., operational agents 908).

Operational agents 908 may include one or more computing engines that may include one or more non-transitory computer-readable media having stored thereon executable instructions operable to instruct a processor to provide operational functions. At an appropriate time, such as upon booting hardware platform 900 or upon a command from operating system 906 or a user or security administrator, a processor 902 may retrieve a copy of the operational agent (or software portions thereof) from storage 950 and load it into memory 904. Processor 902 may then iteratively execute the instructions of operational agents 908 to provide the desired methods or functions.

As used throughout this specification, an "engine" includes any combination of one or more logic elements of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

In some cases, the function of an engine is described in terms of a "circuit" or "circuitry to" perform a particular function. The terms "circuit" and "circuitry" should be understood to include both the physical circuit, and in the case of a programmable circuit, any instructions or data used to program or configure the circuit.

Where elements of an engine are embodied in software, computer program instructions may be implemented in programming languages. These may be used with any compatible operating systems or operating environments. Hardware elements may be designed manually, or with a hardware description language. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

Communication devices 940 may communicatively couple hardware platform 900 to a wired or wireless network or fabric. A "network," as used throughout this specification, may include any communicative platform operable to exchange data or information within or between computing devices, including any of the protocols discussed in connection with FIG. 1 above. A network interface may include one or more physical ports that may couple to a cable (e.g., an Ethernet cable, other cable, or waveguide), or a wireless transceiver.

In some cases, some or all components of hardware platform 900 may be virtualized, in particular the processor(s) and memory. For example, a virtualized environment may run on OS 906, or OS 906 could be replaced with a hypervisor or virtual machine manager. In this configuration, a virtual machine running on hardware platform 900 may virtualize workloads. A virtual machine in this configuration may perform essentially all functions of a physical hardware platform.

In some cases, any suitably configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Selected Examples

Various embodiments of the present disclosure may be understood in the context of several example implementations.

This is disclosed in one example, a method of a device communicating messages in an AV, comprising: participating in mutual authentication with a key server located on the AV; receiving from the key server a cryptographic key; using the cryptographic key for symmetric cryptography, comprising signing messages sent to or verifying messages received from another device of the AV; and clearing the cryptographic key at reboot.

There is further disclosed an example, further comprising accepting a message from the other device only if a signature provided with the message can be verified with the cryptographic key.

There is further disclosed an example, further comprising incrementing a nonce counter for each message received from the other device, and accepting a received message only if a nonce value appended to the received message matches the nonce counter.

There is further disclosed an example, further comprising incrementing a nonce counter for each message received from the other device, and accepting a received message only if a nonce value appended to the received message is greater than or equal to the nonce counter, and if the nonce value appended to the message is greater than the nonce counter, setting the nonce counter to the nonce value appended to the message.

There is further disclosed an example, wherein participating in mutual authentication comprises participating in mutual TLS (mTLS) authentication with the key server.

There is further disclosed an example, further comprising determining on boot if a TLS certificate for the device is valid and unexpired, and if the certificate is in invalid, expired, or within a threshold of expiration, receiving a new certificate from a trusted CA external to the AV.

There is further disclosed an example, wherein the messages sent to the other device are UDP messages.

There is further disclosed an example, comprising appending nonce values to messages sent to the other device.

There is further disclosed an example, wherein the nonce values are sequential positive integers.

There is further disclosed an example, further comprising maintaining a nonce counter, and incrementing the nonce counter for each message sent to the other device.

There is further disclosed an example, wherein the nonce counter is a 32-bit counter.

There is further disclosed an example, wherein the nonce counter is a 64-bit counter.

There is further disclosed an example, further comprising storing the cryptographic key in a key store.

There is further disclosed an example, wherein the key store is a volatile-only key store.

There is further disclosed an example, wherein the key store is a non-volatile key store, and further comprising clearing the key store at boot.

An apparatus comprising means for performing the method.

There is further disclosed an example, wherein the means for performing the method comprise a processor and a memory.

There is further disclosed an example, wherein the memory comprises machine-readable instructions that, when executed, cause the apparatus to perform the method.

There is further disclosed an example, wherein the apparatus is a sensor or controller for the AV.

There is further disclosed an example of at least one computer-readable medium comprising instructions that, when executed, implement a method or realize an apparatus as described.

There is further disclosed an example of an electronic system for an AV, comprising: a hardware platform comprising a processor circuit, a memory, and a network interface; and instructions encoded within the memory to: on boot (e.g., of the hardware platform), participate in mutual authentication with a key server, and receive from the key server a symmetric encryption key; maintain the symmetric key within a volatile-only key store; receive via the network interface a message from a sender, wherein the sender is a device on the AV; verify a signature affixed to the message with the symmetric key; and if the verification succeeds, accept the message.

There is further disclosed an example, wherein the instructions are further to, if the verification fails, reject the message.

There is further disclosed an example, wherein the instructions are further to increment a nonce counter for each message received from the sender, and accept the message only if a nonce value appended to the received message matches the nonce counter.

There is further disclosed an example, wherein the instructions are further to increment a nonce counter for each message received from the sender, and accept the message only if a nonce value appended to the received message is greater than or equal to the nonce counter, and if the nonce value appended to the message is greater than the nonce counter, set the nonce counter to the nonce value appended to the message.

There is further disclosed an example, wherein participating in mutual authentication with the key server comprises participating in mutual TLS (mTLS) authentication with the key server.

There is further disclosed an example, further comprising determining on boot if a TLS certificate for the device is valid and unexpired, and if the certificate is invalid, expired, or within a threshold of expiration, receiving a new certificate from a trusted CA external to the AV.

There is further disclosed an example, wherein the message is a UDP message.

There is further disclosed an example, wherein the instructions are further to maintain a nonce counter, and incrementing the nonce counter for each message received.

There is further disclosed an example, wherein the nonce counter is a 32-bit counter.

There is further disclosed an example, wherein the nonce counter is a 64-bit counter.

There is further disclosed an example of a method of provisioning symmetric cryptography keys in an AV, comprising: participating in mutual authentication with a first device of the AV; provisioning a symmetric cryptographic key to the first device; participating in mutual authentication with a second device; determining that the second device is expected to communicate with the first device; provisioning the symmetric cryptographic to the second device; and at reboot, clearing previously-provisioned symmetric cryptographic keys.

There is further disclosed an example, further comprising determining that the second device is not expected to communicate with the first device, and provisioning a different symmetric cryptography key to the second device.

There is further disclosed an example, wherein participating in mutual authentication comprises participating in mutual TLS (mTLS).

There is further disclosed an example, further comprising storing the symmetric cryptographic keys to a volatile-only key store.

VARIATIONS AND IMPLEMENTATIONS

While many implementations are described with respect to an autonomous vehicle, the implementations are also applicable to other vehicles (which may not necessarily be fully autonomous) where network security is a concern.

As will be appreciated by one skilled in the art, aspects of the present disclosure, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the devices and systems (e.g. to the perception system devices and/or their controllers, etc.) or be stored upon manufacturing of these devices and systems. Some implementations can be embodied in one or more non-transitory computer-readable media comprising instructions stored thereon, wherein, the instructions, when executed by one or more processors, can to perform the operations of the methods described herein.

The foregoing detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The preceding disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting.

Other features and advantages of the disclosure will be apparent from the description and the claims. Note that all optional features of the apparatus described above may also be implemented with respect to the method or process described herein and specifics in the examples may be used anywhere in one or more embodiments.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

What is claimed is:

1. A method, comprising:
   after a reboot of a vehicle, performing mutual authentication between a first device and a key server located on the vehicle;
   after the reboot of a vehicle, performing mutual authentication between a second device and the key server;
   storing, by the key server, a cryptographic key in a first volatile memory;
   receiving, by the first device and the second device, from the key server, the cryptographic key;
   storing, by the first device, the cryptographic key in a second volatile memory of the first device;
   storing, by the second device, the cryptographic key in a third volatile memory of the second device;
   in response to determining that the cryptographic key has been provisioned to the first device and the second device, discarding, by the key server, the cryptographic key from the first volatile memory;
   using, by the first device and the second device, the cryptographic key for symmetric cryptography, comprising one or more of: signing messages transmitted between the first device and the second device and verifying messages transmitted between the first device and the second device; and clearing data stored in the first volatile memory, the second volatile memory, and the third volatile memory at a further reboot of the vehicle.

2. The method of claim 1, further comprising accepting a message by the first device from the second device only in response to determining a signature provided with the message can be verified with the cryptographic key.

3. The method of claim 1, further comprising incrementing a nonce counter for each message received by the first device from the second device, and accepting a received message only in response to determining a nonce value appended to the received message matches the nonce counter.

4. The method of claim 1, further comprising:
incrementing a nonce counter for each message received by the first device from the second device;
accepting a received message only in response to determining a nonce value appended to the received message is greater than or equal to the nonce counter; and
in response to determining the nonce value appended to the received message is greater than the nonce counter, setting the nonce counter to the nonce value appended to the received message.

5. The method of claim 1, wherein performing mutual authentication comprises participating in mutual transport layer security authentication with the key server.

6. The method of claim 5, further comprising:
determining on reboot of the vehicle whether a transport layer security certificate for the first device is valid and unexpired; and
in response to determining the transport layer security certificate is invalid, expired, or within a threshold of expiration, receiving a new certificate from a trusted certificate authority external to the vehicle.

7. The method of claim 1, wherein the messages transmitted between the first device and the second device are user datagram protocol messages.

8. The method of claim 1, comprising appending nonce values to messages sent by the first device to the second device.

9. The method of claim 8, wherein the nonce values are sequential positive integers.

10. The method of claim 9, further comprising:
maintaining a nonce counter; and
incrementing the nonce counter for each message sent by the first device to the second device.

11. The method of claim 10, wherein the nonce counter is a 32-bit or 64-bit counter.

12. The method of claim 1, wherein the cryptographic key is stored in a first key store in the first volatile memory.

13. A vehicle, comprising:
a hardware platform comprising a processor circuit, a memory to store instructions, a volatile memory, and a network interface, wherein the instructions, when executed, cause the processor circuit to:
after a reboot of the hardware platform, perform mutual authentication with a key server, and receive from the key server a symmetric key;
maintain the symmetric key within a volatile-only key store in the volatile memory, wherein the symmetric key is cleared at a further reboot of the hardware platform;
receive via the network interface a message from a sender, wherein the sender is a device on the vehicle;
verify a signature affixed to the message with the symmetric key;
in response to the verification succeeding, accept the message; and
in response to the verification failing, reject the message; and
the key server comprising a further volatile memory, the key server to:
store the symmetric key in the further volatile memory;
provision the symmetric key on the hardware platform and the sender; and
in response to determining the symmetric key has been provisioned to the hardware platform and the sender, discard the symmetric key from the further volatile memory.

14. The vehicle of claim 13, wherein the instructions are further to increment a nonce counter for each message received from the sender, and accept the message only if a nonce value appended to a received message matches the nonce counter.

15. The vehicle of claim 13, wherein the message is a user datagram protocol message.

16. The vehicle of claim 13, wherein the instructions are further to maintain a nonce counter, and incrementing the nonce counter for each message received.

17. A method of provisioning symmetric cryptography keys in a vehicle, comprising:
participating in mutual authentication with a first device of the vehicle;
provisioning a symmetric cryptographic key to the first device;
participating in mutual authentication with a second device of the vehicle;
determining that the second device is expected to communicate with the first device;
provisioning the symmetric cryptographic key to the second device;
storing the symmetric cryptographic key in a volatile memory, wherein the symmetric cryptographic key is cleared at reboot of the vehicle; and
in response to determining that the symmetric cryptographic key has been provisioned to the first device and the second device, discarding the symmetric cryptographic key.

18. The method of claim 17, further comprising determining that the second device is not expected to communicate with the first device, and provisioning a different symmetric cryptography key to the second device.

19. The method of claim 18, wherein storing the symmetric cryptographic key in the volatile memory comprises storing the symmetric cryptographic key in a key store in the volatile memory.

20. The method of claim 17, wherein participating in mutual authentication comprises participating in mutual transport layer security.

* * * * *